United States Patent [19]

Millward

[11] 4,227,207
[45] Oct. 7, 1980

[54] CRT FILM SCANNER WITH COMPENSATION FOR LOCAL BRIGHTNESS VARIATIONS OF SCANNING BEAM

[75] Inventor: John D. Millward, Hitchin, England

[73] Assignee: The Rank Organisation Limited, London, England

[21] Appl. No.: 900,489

[22] Filed: Apr. 27, 1978

[30] Foreign Application Priority Data

Apr. 27, 1977 [GB] United Kingdom ............... 52-17535

[51] Int. Cl.$^2$ .............................................. H04N 9/11
[52] U.S. Cl. .................................................... 358/54
[58] Field of Search ................... 358/27, 54, 50, 52, 358/217, 214, 75, 80, 76, 77–79, 215, 216

[56] References Cited

U.S. PATENT DOCUMENTS

| 2,842,610 | 7/1958 | Crosfield et al. ..................... 358/80 |
| 2,979,622 | 4/1961 | Garbundy ............................ 358/217 |
| 3,693,042 | 9/1972 | Fredkin ............................... 358/214 |
| 3,790,707 | 2/1974 | Valenta ............................... 358/216 |

Primary Examiner—John C. Martin
Attorney, Agent, or Firm—Brisebois & Kruger

[57] ABSTRACT

Apparatus for generating color television signals from photographic film by means of a flying spot scanner incorporating a cathode ray tube is provided with a circuit for compensating for differential variations across the color spectrum introduced by variations in the intensity of the scanning beam due to variations in the phosphor, solarization and burning effects on the tube screen, this circuit comprising a photodetector sensitive to the varying intensity scanning beam and feeding a circuit for generating an overall signal representing the variations, selected proportions of this overall compensation signal being used to control respective color channels so that each channel receives a different amount of compensation to compensate for differences in the effects causing such variation across the spectrum of light in the scanning light beam.

6 Claims, 2 Drawing Figures

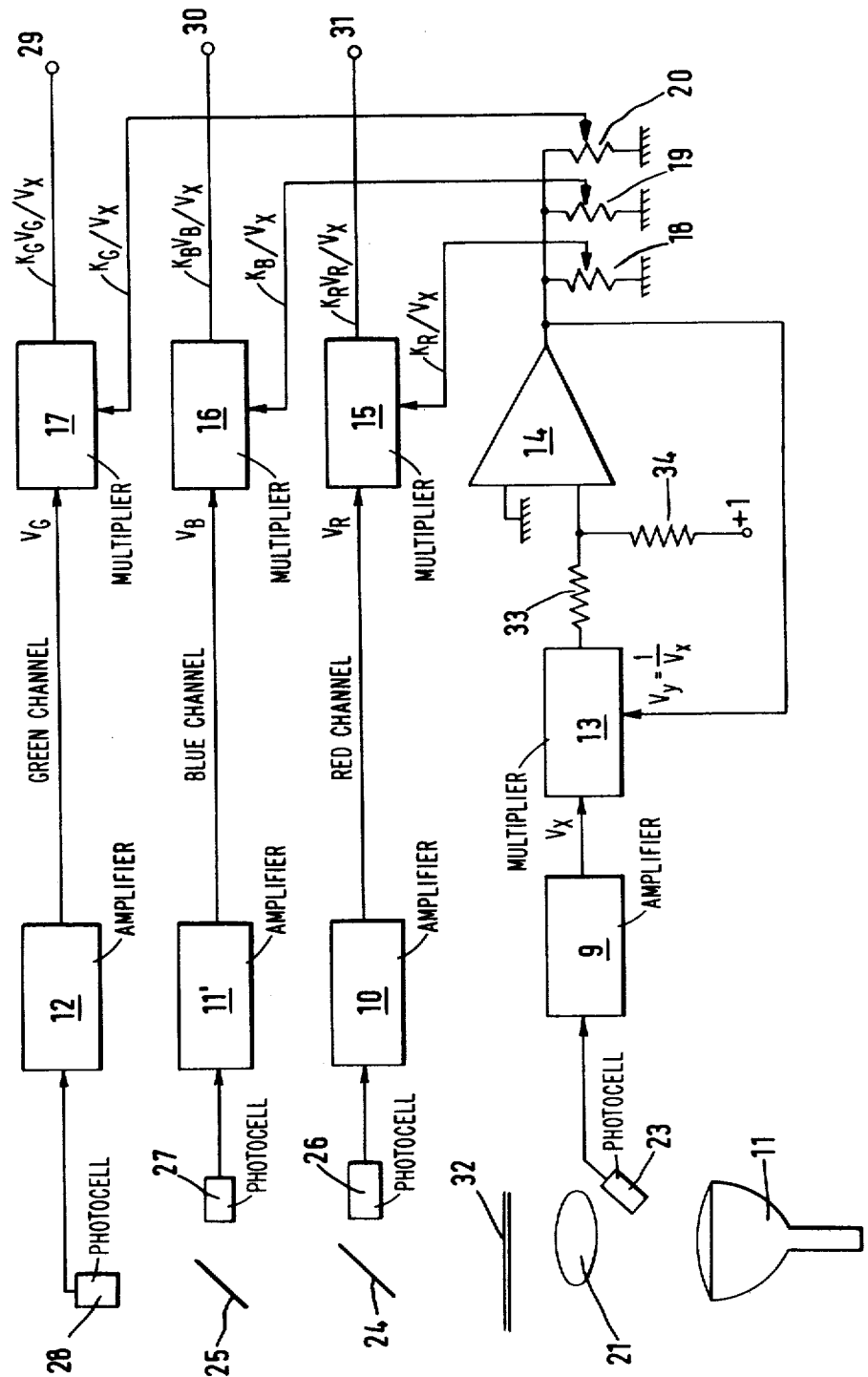

CRT FILM SCANNER WITH COMPENSATION FOR LOCAL BRIGHTNESS VARIATIONS OF SCANNING BEAM

The present invention relates to a flying spot film scanner for producing colour television signals from photographic film.

Such apparatus involves the use of a cathode ray tube or other scanning source, the light from which is focussed onto the film and collected by a suitable arrangement of photocells, dichroic mirrors and lenses after transmission through or reflection by the film to provide therefrom a plurality of different television colour component signals which are subsequently processed and combined in known manner to provide a single colour television signal conforming to a desired standard.

When a cathode ray tube is used as the scanning source a disadvantage arises in that the brightness of the tube and also its colour temperature can vary across the tube face. Such variations, which may be due to phosphor variations, solarisation or burning, lead to spurious variations in the brightness of light transmitted through the film and thus to spurious signals in the ultimately generated television signal. Particularly where colour television signals are concerned this is of considerable significance because the intensity variations also vary over the spectrum. For example, as a cathode ray tube screen burns, the light intensity at the blue end of the spectrum falls faster than that at the red end of the spectrum, although all parts of the spectrum experience some reduction of intensity.

The present invention seeks to provide a flying spot film scanner incorporating a cathode ray tube, whereby such variations in the brightness of the tube upon scanning are, at least partly, compensated for, both as to overall variation and as to the differing variation at different parts of the spectrum.

According to the invention there is provided a flying spot film scanner apparatus for producing colour television signals from photographic film, comprising:
cathode ray tube means for producing a flying spot scanning beam of nominally constant intensity;
first means for focussing said beam onto an image plane wherein a film is located in use of said apparatus;
second means for sensing light modulated by the film to produce a plurality of television colour component signals corresponding to differently coloured components of the film;
a plurality of colour channels for processing respective ones of the colour component signals;
third means responsive to variations in the overall intensity of the scanning beam prior to modulation by the film to generate a further signal which varies with variations in the overall intensity of the beam; and
fourth means responsive to the further signal to apply different individual corrections to the plurality of colour component signals whereby to compensate at least in part for differential intensity variations across the colour spectrum of the scanning beam, the fourth means comprising means for generating individual correction signals as different proportions of the further signal and means for applying said individual correction signals to respective ones of the colour channels.

One embodiment of the present invention will now be more particularly described, by way of example, with reference to the accompanying drawing, which is a block schematic diagram illustrating the invention.

The embodiment illustrated comprises part of a system for producing a colour television signal from film. The system comprises a flying spot cathode ray tube 11 which produces a scanned raster of light of nominally constant intensity. A lens 21 focuses the light onto an image plane at which is positioned a film 32 to be televised.

Light passing through the film is modulated thereby and, since light emitted by the cathode ray tube 11 can be considered as broad band (effectively white) light, the dyes in the colour film will change the characteristic spectrum of this light in accordance with the position of the flying spot on the film. Light passing through the film 32 is then analysed by splitting it into three components for processing in red, blue and green channels. This analysis is effected by means of two dichroic reflectors, one of which, 24, reflects the red end of the spectrum of light incident thereon, and the other of which, 25, reflects the blue end of the spectrum of light incident on it. Three photocells 26, 27 and 28 are arranged to receive light from the reflectors 24 and 25, the photocell 26 receiving light reflected from the reflector 24, light transmitted through the reflector 24 being incident on the reflector 25. The photocell 27 receives light reflected from the dichroic reflector 25 and the photocell 28 receives light transmitted through the dichroic reflector 25.

Electrical signals generated by the three photocells 26, 27, 28 are fed to respective head amplifiers 10, 11, 12 which pass the respective amplified signals $V_E$, $V_B$, $V_G$ multipliers 15, 16, 17 of, respectively, the red channel, the blue channel and the green channel of a system for producing a colour television signal.

A fourth photocell 23 is positioned to receive light from the cathode ray tube 11 in order to detect variations in the light intensity of the scanning beam, in particular to detect the burn factor. In the drawing the fourth photocell 23 is shown merely positioned in front of the screen of the cathode ray tube 11 although it will be appreciated that optical directing elements may be used to direct light from the screen onto the photocell 23 if desired. As the cathode ray tube screen burns, the output from the blue channel falls faster than the output from the green channel which, in turn, falls faster than the output from the red channel due to the different effects over the spectrum of the white light generated by the cathode ray tube 11. The light detected by the photocell 23, however, being unfiltered gives rise to an electrical signal which can be used to generate an overall correction signal to correct the burn error in the red, green and blue channels. The overall correction signal, however, must be modified to make it appropriate for correcting the red, green and blue colour channels and to do this three separate correction signals are generated and separately applied to the multipliers 15, 16, 17 in a manner which will be described below.

It can be shown that in order to correct the error in the signals in the red, green and blue channels it is necessary to multiply the signals by a given proportion of the reciprocal of the signal produced at the output of the fourth photocell 23. In order to generate this reciprocal signal the output of the fourth photocell 23 is fed to an amplifier 9 the output of which produces a signal $V_X$ which, for the purposes of this Specification, will be referred to as the burn signal. In order to generate the reciprocal of the burn signal it is first fed to a multiplier 13 the other input to which is a signal $V_Y$ fed from the output of an operational amplifier 14. The positive input of the operational amplifier 14 is earthed, and the signal from the output of the multiplier 13 is fed to the negative input of the operational amplifier 14 via a series resistor 33. The negative input of the operational amplifier 14 is also fed from a fixed unity potential 35 via a resistor 34. The resistor 33 has a resistance value which is greater than the value of the resistor 34 by the multiplication factor in the multiplier 13.

Since the positive input of the operational amplifier 14 is connected to earth, the negative input will be a virtual earth. Thus, if the input current to the operational amplifier is small it is possible to equate the currents through the resistors 33 and 34, thus:

$$KV_xV_y/KR = 1/R$$

where K is the multiplication factor in the multiplier 13.

From the above expression it can be seen that in this circuit $V_Y = 1/V_X$. The output signal from the operational amplifier 14 is thus the reciprocal of the burn signal $V_X$ produced as the output from the head amplifier 9, and is the overall correction signal referred to above. Three potentiometers 18, 19, 20 are connected in parallel between the output of the operational amplifier 14 and earth, and the wipers of these three potentiometers are respectively connected to the multiplier 15 in the red channel, the multiplier 16 in the blue channel and the multiplier 17 in the green channel, the setting of the three potentiometers 18, 19, 20 determining the factors $K_R$, $K_B$, and $K_G$ by which the product of the input signals $V_R/V_X$, $V_B/V_X$ and $V_G/V_X$ are multiplied. The outputs from the three multipliers 15, 16, 17 are fed to respective terminals 31, 30, 29 for further processing in known manner to provide a single colour television signal conforming to a desired standard.

The above circuit thus generates signals on three colour television channels and automatically compensates not only for overall variation in the brightness of the scanning beam produced by the cathode ray tube 11, but also provides a differential compensation for the varying effect of the intensity variations in different parts of the colour spectrum of the nominally white light produced by the cathode ray tube 11, due to solarization and burning of the screen.

I claim:

1. A flying spot film scanner apparatus for producing colour television signals from photographic film, comprising:
   cathode ray tube means for producing a flying spot scanning beam of nominally constant intensity;
   first means for focussing said beam onto an image plane wherein a film is located in use of said apparatus;
   second means for sensing light modulated by the film to produce a plurality of television colour component signals corresponding to differently coloured components of the film;
   a plurality of colour channels for processing respective ones of the colour component signals;
   third means responsive to variations in the overall intensity of the scanning beam prior to modulation by the film to generate a further signal which varies with variations in the overall intensity of the beam; and
   fourth means responsive to the further signal to apply different individual corrections to the plurality of colour component signals whereby to compensate at least in part for differential intensity variations across the colour spectrum of the scanning beam, the fourth means comprising means for generating individual correction signals as different proportions of the further signal and means for applying said individual corrections signals to respective ones of the colour channels.

2. The film scanner of claim 1 wherein
   said third means which generates a further signal comprises means to generate a further signal which varies in the same sense as variations in the overall intensity of the beam; and
   said fourth means which generates individual correction signals comprises means for generating individual correction signals as different proportions of the inverse of the further signal.

3. The film scanner of claim 2, wherein the colour channels are red, blue and green colour channels each including a respective amplifier and a respective multiplier circuit connected to the output of the respective amplifier, and wherein the fourth means comprises means for inverting the further signal to form an overall correction signal and means for generating the individual correction signals as selected fractions of the overall correction signal, and means for feeding the individual correction signals to respective ones of the multiplier circuits of the red, blue and green colour channels whereby to compensate for the greater variations in light intensity towards the blue end of the spectrum.

4. The film scanner of claim 3, wherein there are provided three potentiometers across which the overall correction signal is applied, the respective fractions of the overall correction signal fed to the respective multiplier circuits being determined by the settings of the potentiometers.

5. The film scanner of claim 3, wherein the third means comprises a photocell positioned to receive light from the scanning light beam, and a further amplifier to which is fed the output of the photocell.

6. The film scanner of claim 3, wherein the means for inverting the further signal comprises an operational amplifier having a positive input and a negative input, the positive input being grounded, a unity voltage source, a first resistor connected in series between the output of the further multiplier circuit and the negative input of the operational amplifier, a second resistor connected between the negative input of the operational amplifier and the unity voltage source, the value of the first resistor being greater than that of the second resistor by a factor equal to the multiplication factor of the further multiplier circuit, and means connecting respective inputs of the further multiplier circuit to the output of the further amplifier and to the output of the operational amplifier, the overall correction signal appearing at the output of the operational amplifier.

* * * * *